(12) United States Patent
Emmons

(10) Patent No.: US 9,858,050 B2
(45) Date of Patent: Jan. 2, 2018

(54) SYSTEM AND METHOD FOR STREAMLINING USER INTERFACE DEVELOPMENT

(71) Applicant: Andrew T. Emmons, Ottawa (CA)

(72) Inventor: Andrew T. Emmons, Ottawa (CA)

(73) Assignee: YOUI LABS INC., Ottawa, Ontario (CA)

( * ) Notice: Subject to any disclaimer, the term of this patent is extended or adjusted under 35 U.S.C. 154(b) by 61 days.

(21) Appl. No.: 13/933,351

(22) Filed: Jul. 2, 2013

(65) Prior Publication Data
US 2015/0012905 A1 Jan. 8, 2015

(51) Int. Cl.
*G06F 9/44* (2006.01)
*G06F 3/00* (2006.01)

(52) U.S. Cl.
CPC .................... *G06F 8/38* (2013.01)

(58) Field of Classification Search
CPC ....................................... G06F 3/048
See application file for complete search history.

(56) References Cited

U.S. PATENT DOCUMENTS 7,441,200 B2 * 10/2008 Savage ................ G06F 3/0481
715/744
8,281,238 B2 * 10/2012 Sweeney ........... G06F 17/30731
715/273

(Continued)

FOREIGN PATENT DOCUMENTS

FR WO0195102 * 12/2001 ............... G06F 9/44
WO 0195102 A1 12/2001

OTHER PUBLICATIONS

International Searching Authority, Written Opinion and International Search Report dated Oct. 15, 2014 issued in PCT/CA2014/000530.

(Continued)

*Primary Examiner* — Lewis A Bullock, Jr.
*Assistant Examiner* — Melissa Alfred
(74) *Attorney, Agent, or Firm* — Norton Rose Fulbright Canada LLP; Maya Medeiros

(57) ABSTRACT

A computer network implemented system is provided that provides a development platform for streamlining the creation of graphical user interface having natural user interface (NUI) attributes (the "platform"). The platform is based on a novel and innovative development framework and workflow that enables the creation of executable GUI elements. A display utility provides a series of screens that provide access to functions that capture a designer's user interface design intent. A user interface is provided that allows a designer to capture the various elements and information indicative of their intent relative to the UI design, to enable creation of a series of UI assets that are encoded with sufficient information to enable their rendering with significantly reduced development effort than in prior art solutions. In one aspect, the assets referred to herein incorporate coding elements corresponding to relevant effects such as position, animation, and "look". The elements together represent the design intent that is important to convey the important elements for accurately rendering a NUI. More specifically, the platform is designed to encode the assets with state to state transitions such that the assets themselves can be manipulated (to change order and make modifications for example), and yet these assets are also executable.

20 Claims, 13 Drawing Sheets

(56) References Cited

U.S. PATENT DOCUMENTS

| | | | | |
|---|---|---|---|---|
| 8,856,667 | B2* | 10/2014 | Gaudette | G06F 8/34 |
| | | | | 715/763 |
| 8,938,685 | B2 | 1/2015 | Zavatone | |
| 8,963,847 | B2 | 2/2015 | Hunt | |
| 8,982,132 | B2* | 3/2015 | Blas, Jr. | G06T 13/00 |
| | | | | 345/427 |
| 2004/0205515 | A1* | 10/2004 | Socolow | G06F 17/24 |
| | | | | 715/202 |
| 2012/0173567 | A1 | 7/2012 | Zavatone et al. | |
| 2012/0174000 | A1* | 7/2012 | Zavatone | G06F 8/38 |
| | | | | 715/763 |
| 2013/0036375 | A1 | 2/2013 | Zavatone et al. | |

OTHER PUBLICATIONS

English translation of WO 01/95102A1, provided by International Searching Authority with Written Opinion and International Search Report dated Oct. 15, 2014.
EPO, Extended European Search Report for EP Application No. 14819710.6 dated Feb. 23, 2017.

\* cited by examiner

SYSTEM AND METHOD FOR STREAMLINING USER INTERFACE DEVELOPMENT

FIELD OF THE INVENTION

The present invention relates generally to user interface development. The present invention further relates to solutions for aiding in the development of natural user interfaces (NUI).

BACKGROUND OF THE INVENTION

User interface (UI) is created for use in many software programs and to interact with functions of a variety of hardware device. For example, cameras, DVD players, music players, set-top boxes, mobile devices, and so on all have UI components.

More broadly speaking, user experience (UX) refers to a person's perceptions and responses that result from the use or anticipated use of a product, system or service. UI elements are designed in part around user workflows driven when a user interacts with system features that are part of the overall UX.

There is significant demand for UI that is developed based on "natural user interface" principles. Natural user interface is the common parlance used by designers and developers of human-machine interfaces to refer to a user interface that is (1) effectively invisible, or becomes invisible with successive learned interactions, to its users, and (2) is based on "natural" elements. "Natural" in this context means that the elements need not be learned, or require less learning, as they mimic known or already learned processes. The natural elements are contrasted for example with the artificial user elements used for example in control interfaces that are not created based on natural user interface principles.

Designing and implementing UI components, and broader UX elements, however, is generally quite time consuming and expensive.

Generally speaking, NUI elements are created using processes involving both designers and programmers. Designers use such tools as AFTER EFFECTS™ to compose the look and feel of a UI or UX.

Software developers then attempt to develop assets that convey the intention of the designers, but many times key elements intended by the designers are lost in translation. As a result, assets are generally sent back to the designers and they identify elements that require changes. This results in back and forth and contributes generally to an iterative and time consuming process. Furthermore, UI development requires iteration generally, and this is time consuming and expensive to do using prior art solutions.

Therefore, what is needed is a solution to address at least some of these limitations.

SUMMARY OF THE INVENTION

A computer network implemented system is provided that provides a development platform for streamlining the creation of graphical user interface having natural user interface (NUI) attributes (the "platform"). The platform is based on a novel and innovative development framework and workflow that enables the creation of executable GUI elements. A display utility provides a series of screens that provide access to functions that capture a designer's user interface design intent.

A composition panel allows a designer to capture the various elements and information indicative of their intent relative to the UI design, to enable creation of a series of UI assets that are encoded with sufficient information to enable their rendering with significantly reduced development effort than in prior art solutions. In one aspect, the assets referred to herein incorporate coding elements corresponding to relevant effects such as position, animation, and "look". The elements together represent the design intent that is important to convey the important elements for accurately rendering a NUI. More specifically, the platform is designed to encode the assets with state to state transitions such that the assets themselves can be manipulated (to change order and make modifications for example), and yet these assets are also executable.

In one aspect of the invention, a computer implemented method is provided comprising: a first computing device hosting a collaborative user interface development environment; a second computing device associated with a designer, that connects to the collaborative user interface development environment for composing a user interface using a plurality of user interface assets that encode the designer's intent; and a third computing device rendering an executable user interface, by compiling the using interface assets.

In another aspect, a computer system is provided for streamlining the design of user interface elements comprising: one or more computers, executing one or more computer programs, that define a collaborative user interface development environment (the "platform"), wherein: the platform includes a composition utility that enables one or more users to create a series of user interface assets that are encoded with sufficient information to enable their rendering by a rendering utility; and the rendering utility renders user interface elements using the user interface assets in a what that related effects are rendered accurately.

In another aspect, the computer system comprises an extractor that decomposes a user interface design into a series of user interface components, and wherein the composition utility enables one or more users to (A) create one or more user interface controls for a user interface design of the video content, and (B) add behavior class names for each behavior control.

In a still other aspect, the platform enables the creation of the assets by (A) exporting UI controls to an asset file, (B) importing UI controls into source code, and accessing or generating one or more code components to execute business logic related to user interface functions ("business logic") by importing the user interface controls into source code, and writing or importing specific code into the source code to execute the business logic.

In another aspect, the computer system enables one or more users to encode the user interface assets with state to state transitions, such that the assets can be manipulated in connection with a user interface design workflow and also executed by the rendering utility.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

A computer network implemented system is provided that provides a development platform for streamlining the creation of graphical user interface having natural user interface (NUI) attributes (the "platform"). The platform is based on a novel and innovative development framework and workflow that enables the creation of executable GUI elements.

Figure 1:
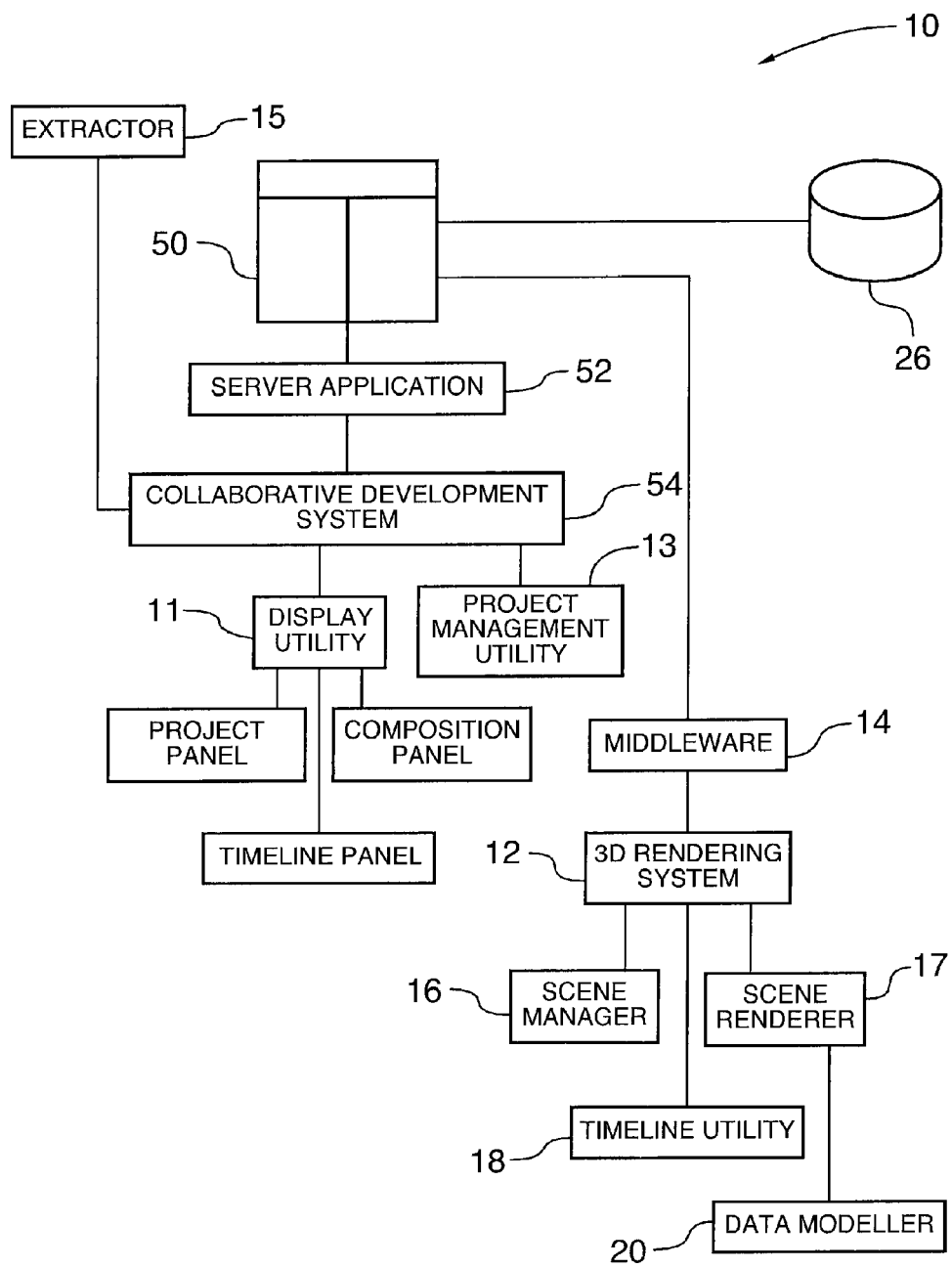
FIG. 1 illustrates an example of a computer network implementation of the system of the present invention.

As shown in FIG. 1, in one aspect, the platform (10) includes a display utility (11) that presents a series of screens made accessible to platform users to access the functions and features described herein. In one implementation, the platform (10) includes or links to a project management utility (13). The project management utility (13) may incorporate standard features for creating and managing UI development related projects.

The display utility (11) may present a project panel (to access features of the project management utility (13)), a composition panel, and a timeline panel. The project panel acts as a bin to import stills, video, and audio footage items. Footage items from the project panel are used in the timeline panel, where layer order and timing can be adjusted. The items visible at the current time marker are displayed in the composition panel, which is used to add transitions and other effects.

The composition panel allows a designer to capture the various elements and information indicative of their intent relative to the UI design, to enable creation of a series of UI assets that are encoded with sufficient information to enable their rendering with significantly reduced development effort than in prior art solutions. In one aspect, the assets referred to herein incorporate coding elements corresponding to relevant effects such as position, animation, and "look". The elements together represent the design intent that is important to convey the important elements for accurately rendering a NUI. More specifically, the platform is designed to encode the assets with state to state transitions such that the assets themselves can be manipulated (to change order and make modifications for example), and yet these assets are also executable.

In one aspect, the platform includes a 3D rendering system (12) that is programmed to display and animate UI elements. The rendering system (12) renders UI elements using the assets in a way that related effects are accurately rendered.

In one aspect, a designer uses an existing motion graphics/visual graphics platform (11) ("visual graphics platform"), such as AE, and the output from the visual graphic platform is imported to the platform (10) of the present invention. The output generally consists of video content that shows UI elements organized in an animated workflow that illustrates interaction with the UI elements.

In one aspect, the 3D rendering system (12) includes: (A) a scene manager (16), (B) a scene renderer (17), and (C) a timeline utility (18).

Figure 2:
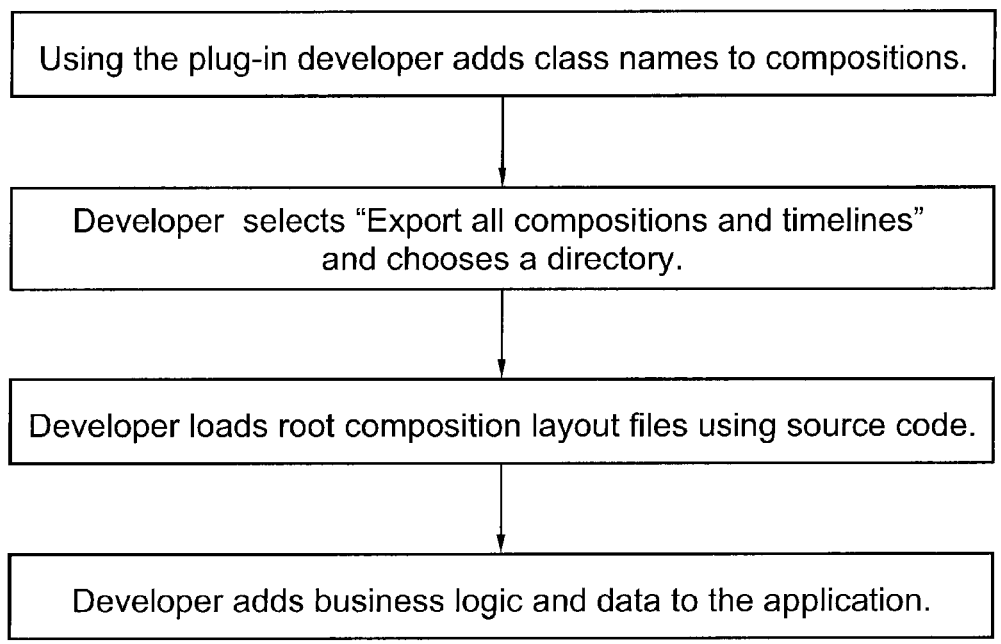
FIG. 2 is a high level workflow diagram illustrating a workflow representing an example of the computer implemented method of the present invention.

FIG. 2 illustrates one example of implementation of the workflow described herein. A representative implementation of the invention is shown in FIG. 2 as a possible workflow for practicing the invention. (A) A platform user who is a designer creates a UI layout and associated animations for example using AE or a similar platform. (B) A platform user who is a developer loads an AE project file into AE, wherein AE includes a plug-in in accordance with the present invention. (C) Using the plug-in the platform user who is a developer adds class names to compositions, based on the present invention. (D) The platform user who is a developer optionally selects "Export all compositions and timelines" or equivalent from the plug-in and chooses a directory. (D) The platform user who is a developer loads root composition layout files using source code. (E) The platform user who is a developer adds business logic and data to the application.

In another aspect, a computer implemented method is provided for designing and implementing a series of UI elements in a streamlined way. One implementation of the method consists of: (A) decomposing a UI design into a series of UI components (usually UI designer); (B) creating UI controls for the UI design, using a design tool or composition tool (usually UI designer); (C) add behavior class names for each behavior control (usually UI designer); (D) export UI controls to an asset file (usually UI designer); (E) import UI controls into source code (UI designer or UI developer); (F) access or generate specific code to handle business logic (for example what happens when a specific button is pushed) (usually UI developer); (G) Export UI controls to asset files (UI Developer); (H) import UI controls into source code (UI Developer); and (I) write or import specific code to handle business logic—e.g. what happens when a button is pushed (UI Developer).

The present invention provides a collaborative user interface development environment. As previously explained, user interface development usually involves both designers and developers. Possible steps of a development workflow are explained, including which steps may be executed (using the platform of the present invention) by a designer, and which steps by a developer. One aspect of the present invention, is that user interface is simplified and therefore it should be understood that steps previously requiring a developer may be executed by a designer, and possibly vice versa. Furthermore, the overall workflow is streamlined thereby allowing new collaborative methods and ways of working, including for example making modifications to a user interface development quickly or possibly in real time upon receipt of feedback from a designer, allowing tighter and more efficient working relationships between collaborators. The platform also allows larger teams to work together more effectively by providing a consistent way of completing work elements, allowing multiple individuals to pick up project tasks, with minimal effort required for a new person to a project to get up to speed.

If necessary, an additional step consists of iterating the UI controls using the design tool.

A "UI control" is an element of a GUI that displays an information arrangement changeable by the user, such as a window or a text box. UI controls can have both presentation and behavior.

The input to the computer system and method of the present invention may consist of output files from a number of systems such as: (A) graphics files such as PNG or JPEG; (B) scene trees such as those generated by such platforms as AFTER EFFECTS™ (AE) of Adobe; or (C) animation files generated by AE or FLASH™.

In one aspect, the present invention handles both time-based animation files and frame-based animation files.

In one aspect, the platform receives as input files from a motion graphics/visual effects platform such as AE. AE is used to develop sophisticated videos using a large number of effects and a 3D stage. Adobe publishes an API which allows developers to extract information within the content. There are many commercial graphical design tools which help designers create 3D content in this way such as Maya™, 3D Studio™, Blender™, etc., and the present invention may interoperate with such platforms as well.

In one aspect, the platform includes an extractor (15) that analyzes the output files. The computer system provides a number of tools that allows platform users to add class names to as to identify components that are UI controls.

Alternatively, the extractor (15) analyzes, and identifies, components that constitute UI controls. In addition, in one aspect, the platform categorizes UI controls into "presentation" related UI controls and "behavior related" UI controls. UI controls can have both presentation and behavior.

The separate treatment of presentation and behavior, allows the treatment of presentation as part of asset files. In one aspect, the extractor (15) is operable to differentiate between presentation related attributes and behavior related attributes, and generate UI assets based on the input in a way that attributes are encoded based on their type, i.e. whether they are presentation or behavior related. This aspect allows the UI assets to be manipulated as required by the designer, and also for UI assets to encode the designer's intent for aspects of the computer system operations managed by developer users.

The presentation may consist of: (A) location (position, scale, rotation), (B) opacity (how translucent it is), (C) bitmaps (the graphics to display the control), (D) visual effects (lighting, shadows, blur), and (D) animations (how parts of the control move in response to events). The behavior consists of: states of the control (pushed up, pushed down, scrolling, etc) information on how to transition from one state to another. The presentation of a UI control is developed in a commercial tool that UI designers know how to use, and then exported as asset files.

Figure 6:
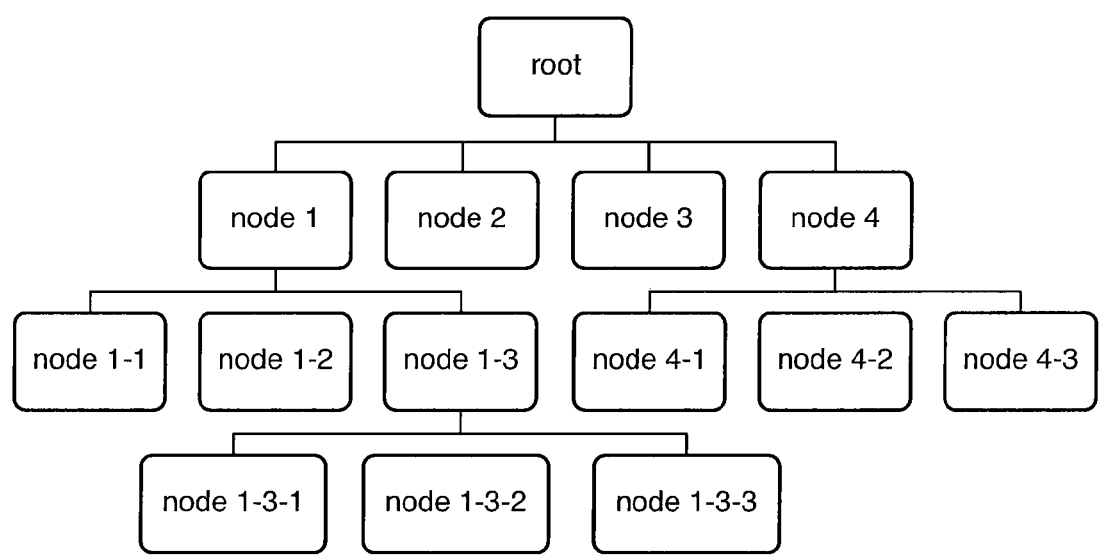
FIG. 6 illustrates the tree structure presented by the platform of the present invention.

This workflow is for UI controls that are described in 3D space, using a 3D coordinate system and a camera which determines how they are rendered on the screen. These controls are described visually using a tree structure, where each node in the tree can be a graphical element to display, as shown in FIG. 6. This graphical element can be a single quad of triangles, or a large mesh of many thousands of triangles. The behavior may be defined in C++ classes within the platform (10), by instantiating appropriate classes for the UI control when the asset file is loaded.

Even though presentation and behavior are separated, they need to communicate with each other. For example, at some point a change in the behavior may trigger a particular visual effect, and so this effect has to be communicated to the behavior code. There are a number of ways that the presentation content can communicate to the behavior code, for example specific presentation related names can be used to name each element. These names can then be used in behavior code to identify a particular element. Markers can be added to timelines thereby indicating for example for an animation, a start, end and name for a particular portion of an animation. The behavior code can then use this to extract a specific animation based on a name.

Assigning a class name to a control—each UI control can have a string associated with it which indicates the C++ class that will be instantiated when the asset file is loaded. This is the mechanism used to bind the presentation to behavior.

A single UI control can export two files—a layout file and a timeline file. The layout files describe the attributes of each node in the control such as position, rotation, anchor point, scale, orientation opacity source—either a bitmap file, a solid color, or another UI control.

If the source is another UI Control, the export process becomes recursive and writes files for each embedded control. During this process, animation information is saved within a separate timeline file. The animation information contains data needed to change attributes of nodes within the control over time.

Importing Presentation Data

Importing layout files results in creating C++ classes that both render to the screen and provide UI behavior. Rendering is achieved by using a 3D scene graph data model, which allows the user interface to be hardware accelerated by a GPU. Behavior is achieved by classes which are derived from a base view class. This base view class is in turn derived from a base scene node, as shown in FIG. 6 for example.

Importing .timeline files results in creating instances of the timeline class. This class stores all information required to animate attributes of the scene tree that was created when importing the .layout file. The timeline markers are used to create named timelines of a given duration that will be started and stopped based on UI behavior and state.

In one aspect, the scene manager (16) allows a user to define a 3D scene for a UI project using a tree structure, wherein each component corresponds to a UI element, and its position in the tree structure is indicative of the UI elements position in 3D space.

FIG. 6 illustrates the operations of the scene manager (16), wherein a tree structure comprising a plurality of nodes that are called scene nodes. The scene manager (16) assists platform users in being able to organize UI scenes and their relationships with one another. The scene manager (16) also is configured to enable transformations of scenes through the UI that it presents. For example application of a transform to a specific node applies the same transformation to all of its child nodes, if any.

The scene renderer (17) includes a data modeller (20) to drive the rendering of UI elements.

Significantly, the scene nodes contain not only their position data, but other data related to rendering such as for example vertex, mesh and material data, thereby enabling the scene renderer (17) to render on a node by node basis if this is requested by a user.

The scene renderer (17), in one implementation, is programmed to render 3D graphics on a wide range of rendering APIs such as OpenGL ES 2.0, DirectX, PS3, etc. In one implementation, the scene renderer (17) requests a display list from the scene manager (16). The display list can consist of an optimized data stream that compiles information for each scene node.

In one implementation, the scene renderer (17) uses abstract constructs for rendering one or more UI graphical objects, including meshes, materials, and uniform buffers. Significantly, these graphical objects represent sufficient information for rendering as 3D objects. The UI graphical objects are not however a concrete implementation; these using the sub-classes explained below. This way, however, the platform users can interact with 3D content without the need to use underlying rendering APIs that would be required in order to execute to a graphics processing unit ("GPU").

The design of the scene renderer (17) allows a user to generate generic 3D drawings and a range of effects. This allows a designer to compose UI elements, review and make changes to UI elements. In effect, this allows a designer to advance the development of UI and UX elements, without the need to wait for work product from programmers. This speeds up the development process and saves resources. It also allows designers to engage in a development process that is more natural and therefore allows designers to be more creative by following inspiration and testing particular design ideas. The disintermediation of the design process that is involved in prior art solutions, where the workflow is divided between designers and programmers is far less advantageous than the present invention. A key insight of the present invention is the particular level of rendering capability provided, and the UI design features that are associated with the rendering capability.

Timeline Utility

The timeline utility (18) is used to animate scene nodes (transform, opacity) and their contents (vertices, shader variables, etc). The timeline utility (18) provides a list of "tracks", where each track corresponds to one attribute for animation. Each track also contains any number of key times, which are used to identify at what point a value changes to a new value. The key times can also be expressed as Bezier curves which indicate how the values change over time.

In one aspect the rendering system workflow consists of: (A) current time is evaluated and updated; (B) user input is received and handled; (C) timelines are updated with a new time; (D) this results in an update to affected scene nodes and their content; (E) the scene manager is processed; (F) any dirty scene nodes re-calculate their composite world matrices; (G) a draw list is rendered; and (H) the draw list is destroyed.

In one aspect of the present invention, the rendering system (22) of the present invention can be implemented over a middleware layer (24), as shown in FIG. 1. The computer system also includes one or more libraries (26). The libraries (26) may include for example templates for different UI development projects. The libraries (26) may also include routines for items such as image decoding, text glyph rendering, etc.

A template may include a look for a view, or layout. The layout may contain one or more scene nodes that together define the graphical elements for a view. A template can also define the animations for a view for example how items move and relate together when responding to specific states.

Figure 3:
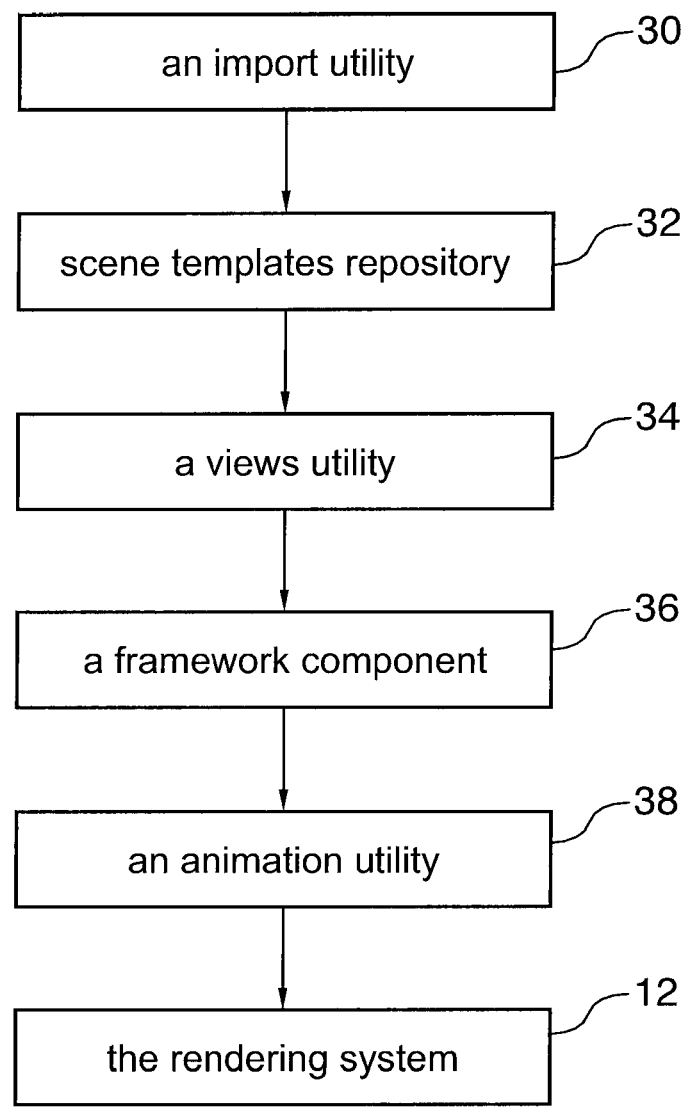
FIG. 3 is a system resource diagram illustrating at a high level a possible implementation of the system of the present invention.

As shown in FIG. 3, the platform (10) may include: (A) an import utility (30); (B) scene templates (32) repository; (C) a views utility (34); (D) a framework component (36); (E) an animation utility (38); and (F) the rendering system (12).

In one aspect, the framework component (36) acts as connector or communication layer between the various components in order to enable the workflows described.

The import utility (30) extracts information from one or more tools and makes the information available to the other components. The views utility (34) may include common UI behaviors, for example ListView, PushButtonView, etc A representative implementation of the rendering system (12) may be implemented with the components shown in FIG. 4. These may include: (A) a component referred to as a CYIDisplay, which is a display component, which abstracts access to the OpenGL hardware; (B) a component referred to as the CYIBuffer, which contains bitmap data and blitting routines for both hardware and software buffers; (C) a component referred to as a CYIRenderer, which contains a list of scene node data, renders using OpenGL; (D) a component referred to as the CYISceneNode, which contains a building block of graphics sub-components, and provides a scene tree that includes positional information (this is no the component where drawing occurs); (E) a component referred to as the CYISceneObject, which is what the user draws; and finally (F) a component referred to as the CYISceneManager, which returns a render list of scene nodes and provides scene node data to the renderer.

Example In Operation

In one possible implementation, the platform (10) uses After Effects™ from Adobe. What follows is an example of the operation of the platform (10), working with After Effects ("AE"). A UI design tool such as AE can communicate with the server application (52) shown in FIG. 1. Alternatively, a plug-in may be provided (not shown) which incorporates aspects of the features described into a UI design tool such as AE. Alternatively, UI design features such as those available through AE, as an example, may be implemented to the server application (52). What follows is an example of the implementation of the present invention, wherein features of a UI design tool such as AE are enhanced using a plug-in, including by optionally leveraging the resources of the server computer (50) that includes collaborative development features that enhance the UI development functions.

AE files consist of nested compositions. Each composition can have layers and/or other compositions. The platform (10) may include a plug-in that extracts files from AE, and specifically layout files for each composition from AE. The layout files extracted from AE may include: (A) a list of layers used in the composition, the layers containing 3D positional data such as position, rotation, anchor point, scale, orientation; and (B) a list of sources used in the composition, which may include bitmaps, NULL objects, solid colors, or compositions.

A platform user can name a composition. Class names are assigned for the purposes of the scene view. The various elements for the composition are defined. Width/height for the scene may be selected using 2D coordinates. The plug-in exports timeline related information from AE (although AE does not contain a timeline concept similar to that used by the platform.

The user selects values for multiple tracks for each element. Each track an element's property—such as position rotation.

For each track, key time information is obtained. This includes for example what a particular value was at a given time, i.e. that at time X track Y had Z value. Rate of change can be determined using for example Bezier control points.

Marker information is obtained from AE that represents logical or functional elements. For example, one marker may indicate 'pushdown', another 'pushup'. These have a start time and duration and allow the platform (10) to automatically bind behavior state to the animation. For example, if the composition class name is 'CYIPushButton-View', and the timeline contained a marker for 'ondown', then that part of the timeline would be used when the user pushes down on the button The platform aligns automatically the various elements with the timeline automatically.

In one implementation, the platform loads the layout file for the root composition and automatically loads other layout files for any embedded compositions. These other layout files are created as CYIAETemplate instances and stored in the asset manager. Timeline files are automatically loaded as well, one per composition. The timeline data is stored in the CYIETTemplate instance.

As the file loading continues, a scene tree of CYISceneView (or derived) instances are created, complete with timeline animation data, from the CYIAETemplates.

FIGS. 7a, 7b, 7c, 7d, 7e, and 7f illustrate the operation of the present invention by referring to a series of representative screenshot views of the platform of the present invention, in one representative implementation of the present invention. In the implementations of the invention shown in these FIGS., in order to illustrate the operation of the present invention, access to features of the platform (10) are shown as enhancements to AE.

Figure 7A:
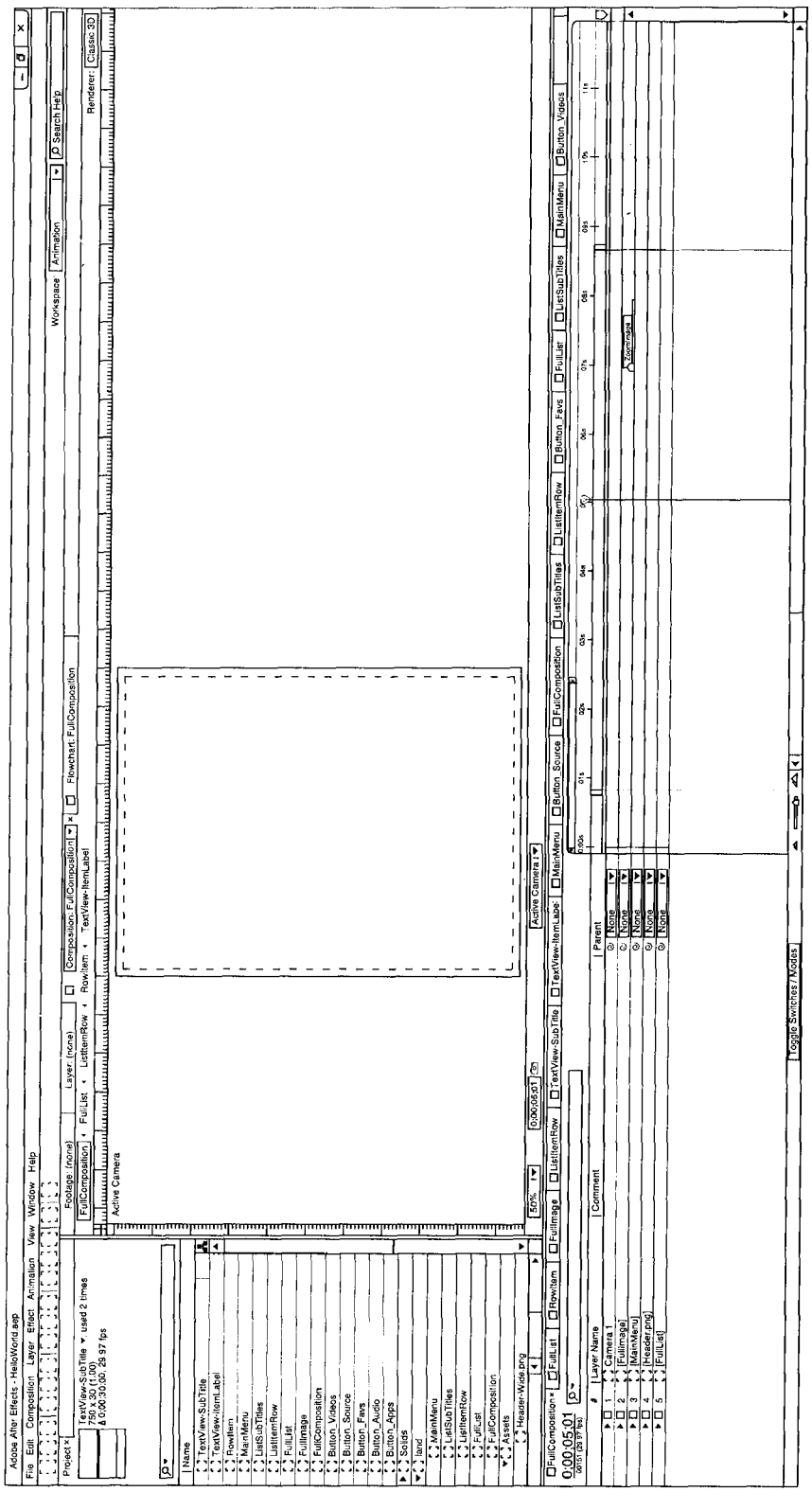
FIGS. 7a, 7b, 7c, 7d, 7e and 7f illustrate aspects of the development workflow of the present invention, while illustrating representative screens presented by the platform.

FIG. 7a shows a screen displayed by the platform (10) that a UI designer user would use to create a UI layout using for example animations from AE. The UI designer can define the position of UI items, how they animate, and how they interact with one another.

Figure 7B:
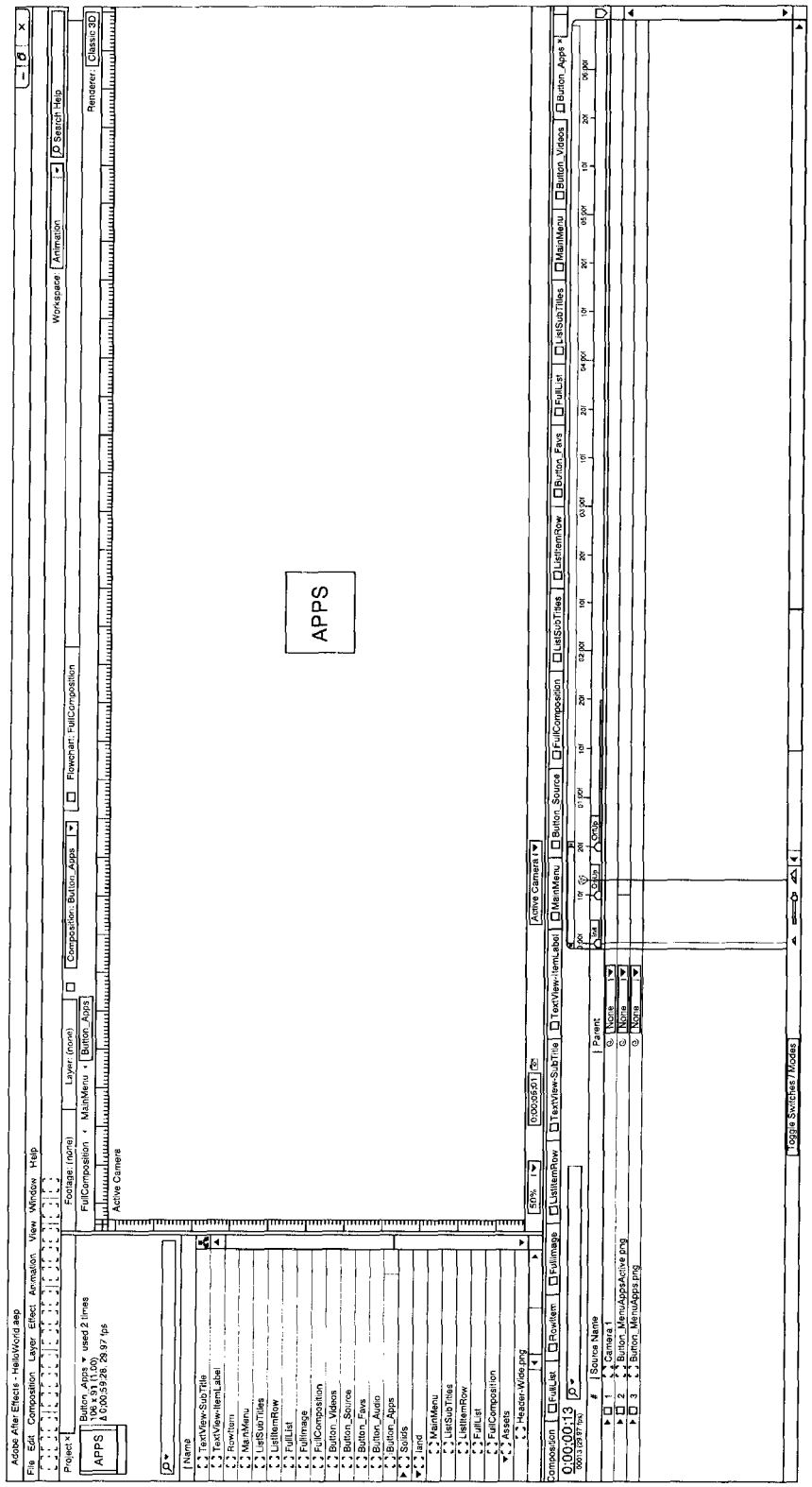

FIG. 7b shows that any given UI design is made of multiple components, each component being for example a composition from AE. For example, each button, or list item, in a given UI design is its own composition. The UI developer then adds animations to the components, and puts specific markers on the timelines to give a context to the timeline. For example, they can add 'DownOn, 'UpPn', etc. markers to the timeline for a button.

Figure 7C:
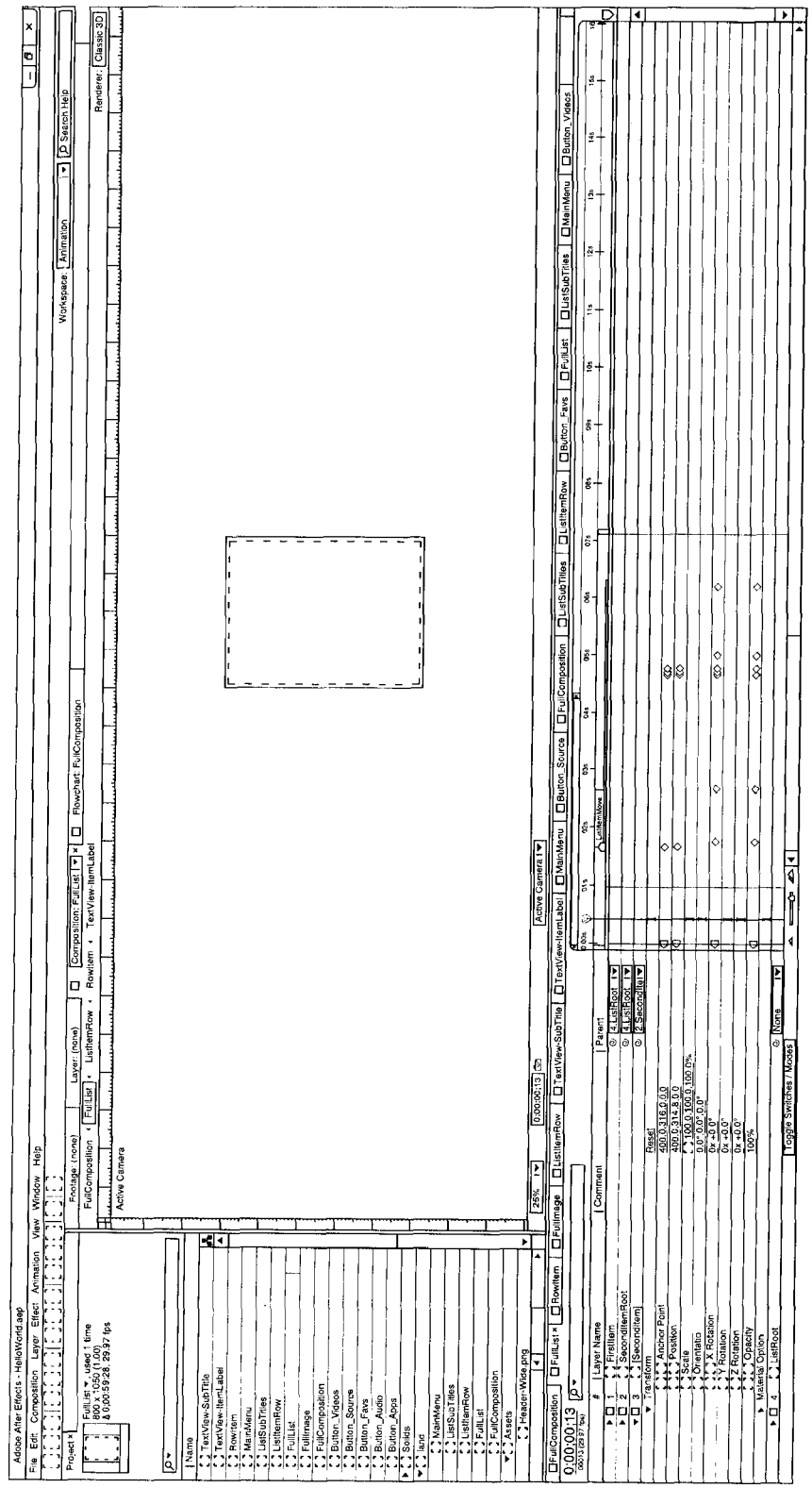

FIG. 7c illustrates a screen where the UI developer can access various other tools to create complex UI controls in order to generate looks and animations based on the EU content.

Figure 7D:
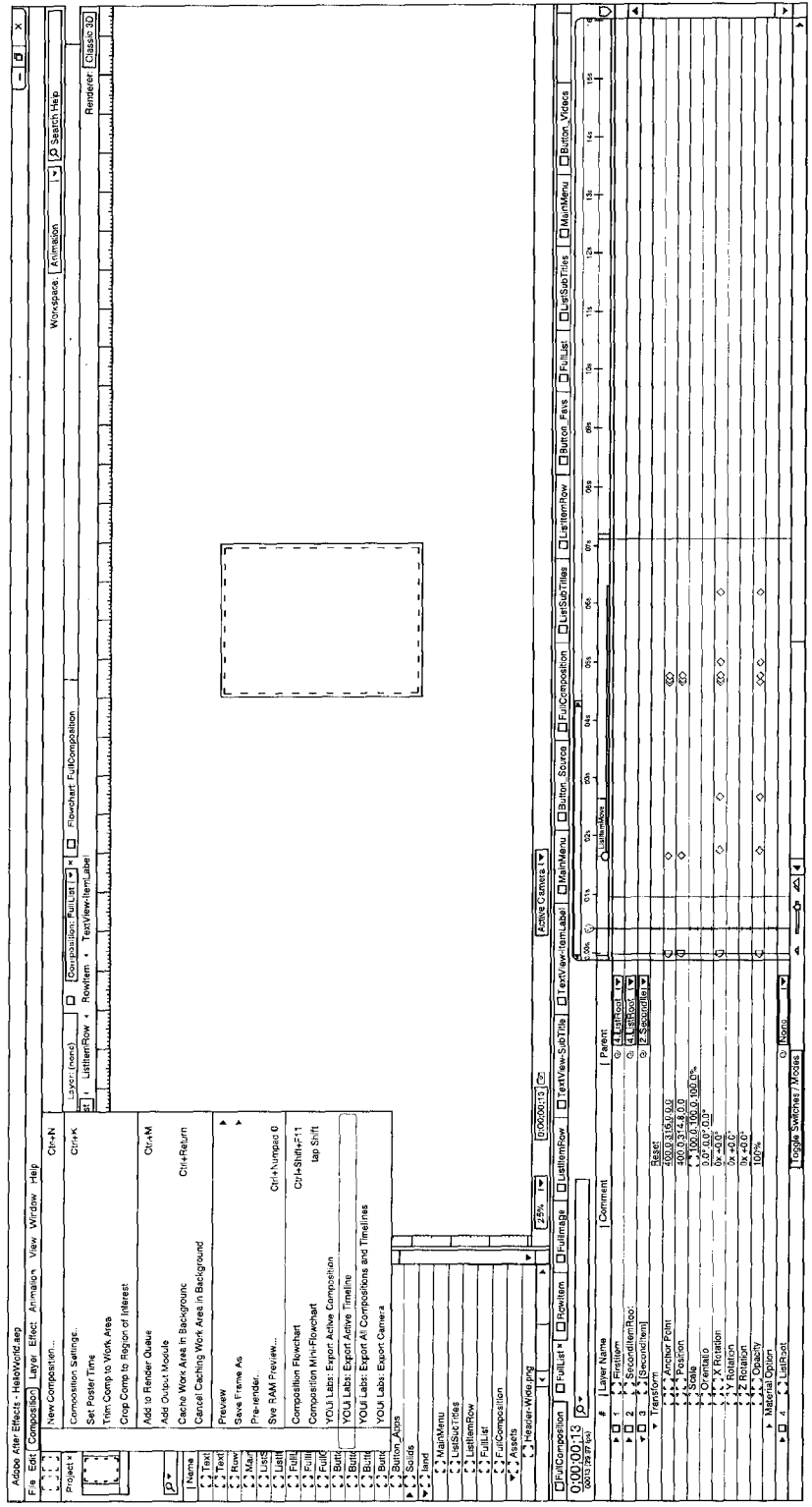

FIG. 7d shows a representative screen once a project has been assigned to a software developer. The platform (10) integrates tools and workflows that are used by designers and developers respectively, in a seamless manner. As shown in FIG. 6d, the developer can provide each composition a class name by adding information in.

Figure 7E:
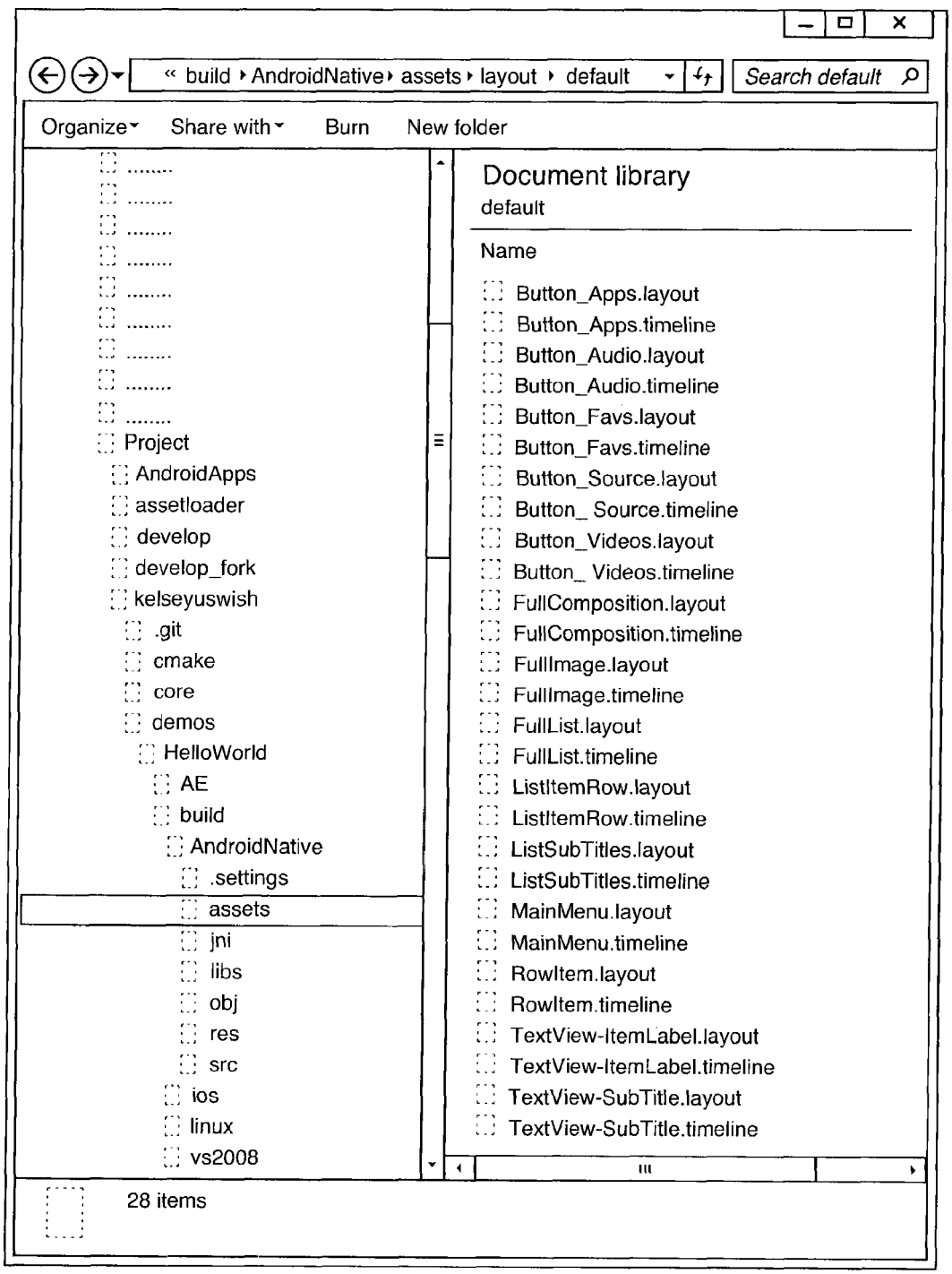

FIG. 7e shows a representative screen displaying the functions of the plugin. The plugin of the platform (10) allows the developer to write a timeline and a layout file for each composition.

Figure 7F:
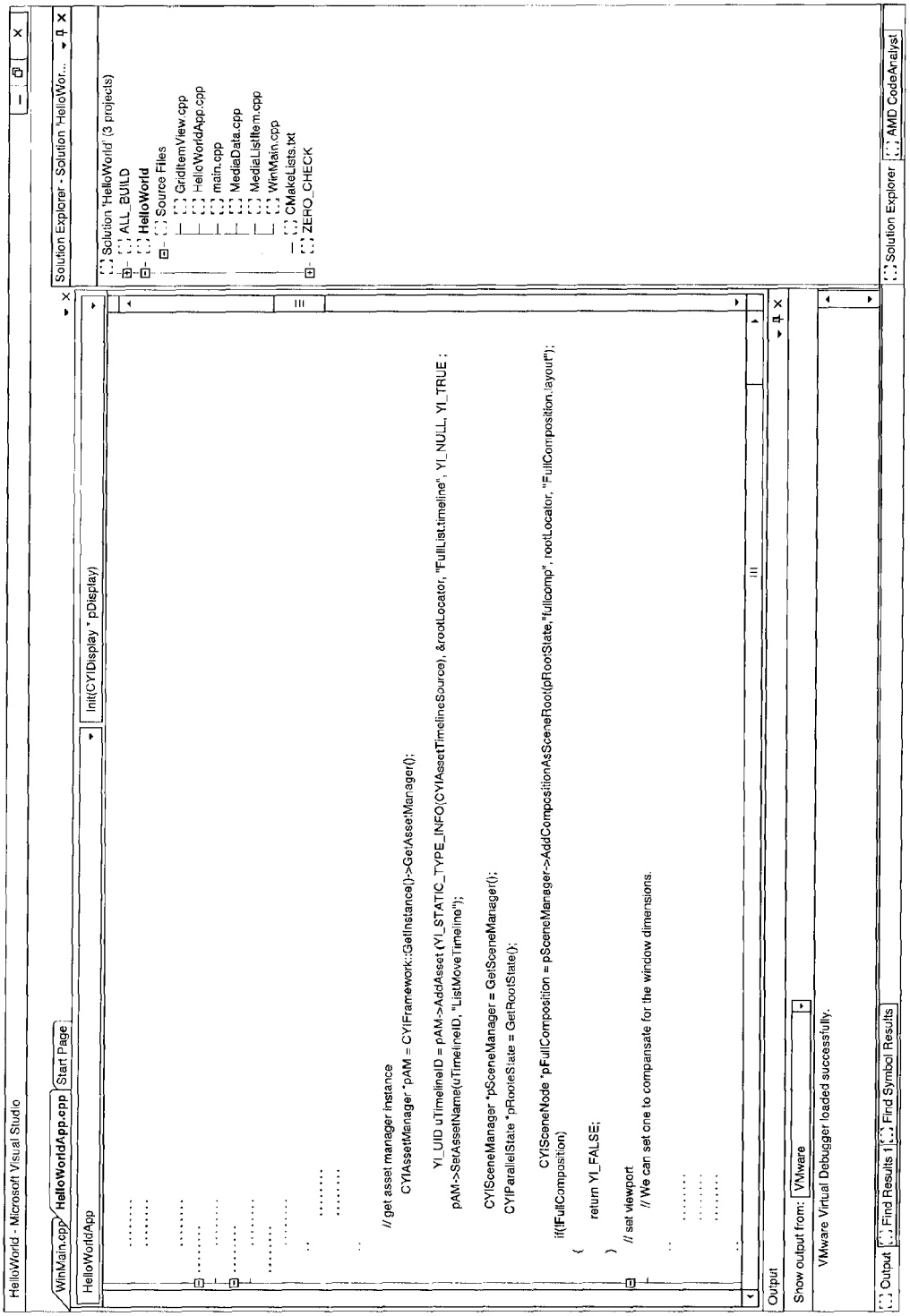

As shown in FIG. 7f, the developer then loads the top-level root composition layout file. This file in turn loads all of the compositions it uses, along with their timeline files. Once loaded, a working UI tree is created that can be rendered with a 3D engine, and can be interacted with by the user. The final step is for the software developer to add business logic—what happens when a button is pushed, what kind of data is used in the list view, etc.

Advantages

Various advantages of the present invention have been mentioned above. Additional representative advantages are now described.

The collaborative platform of the present invention enables designers and programmers to collaborate on complex UI development projects in an efficient manner.

High value UI assets are created in an efficient manner that respects the need for flexibility and responsiveness to support the creative process of UI design.

Use of the platform provides learning opportunities to developers.

The platform enables rapid prototyping and creation of demonstration UI assets that users can provide feedback on, thereby improving the user engagement levels of UI assets.

UI assets can be swapped out, thus enabling rapid development of UI assets based on different scenarios.

The platform permits the capture of the designer's intent in an efficient manner.

The development platform allows development of UI assets across several operating systems.

System Implementation

Referring to FIG. 1 an example of the implementation of the present invention is illustrated, as a computer network implemented system. It should be understood that FIG. 1 illustrates only one possible computer network architecture for implementing the present invention, but the invention is not limited to the particular implementation shown in FIG. 1.

FIG. 1 illustrates a server environment A linked to a server computer (50). Server computer (50) is linked to a server application (52) that includes a collaborative development system (54), which may be implemented as an application repository. The collaborative development system (104) includes the display utility (11) and the project management utility, and in one implementation also integrates the resources of the 3D rendering system (12), which may be implemented as a middleware resource as shown in FIG. 1. In one implementation, the server computer (50) provides online access to the functions of the 3D rendering system (12) in order to enable access to platform users to UI assets developed using the collaborative development system (54).

Figure 4:
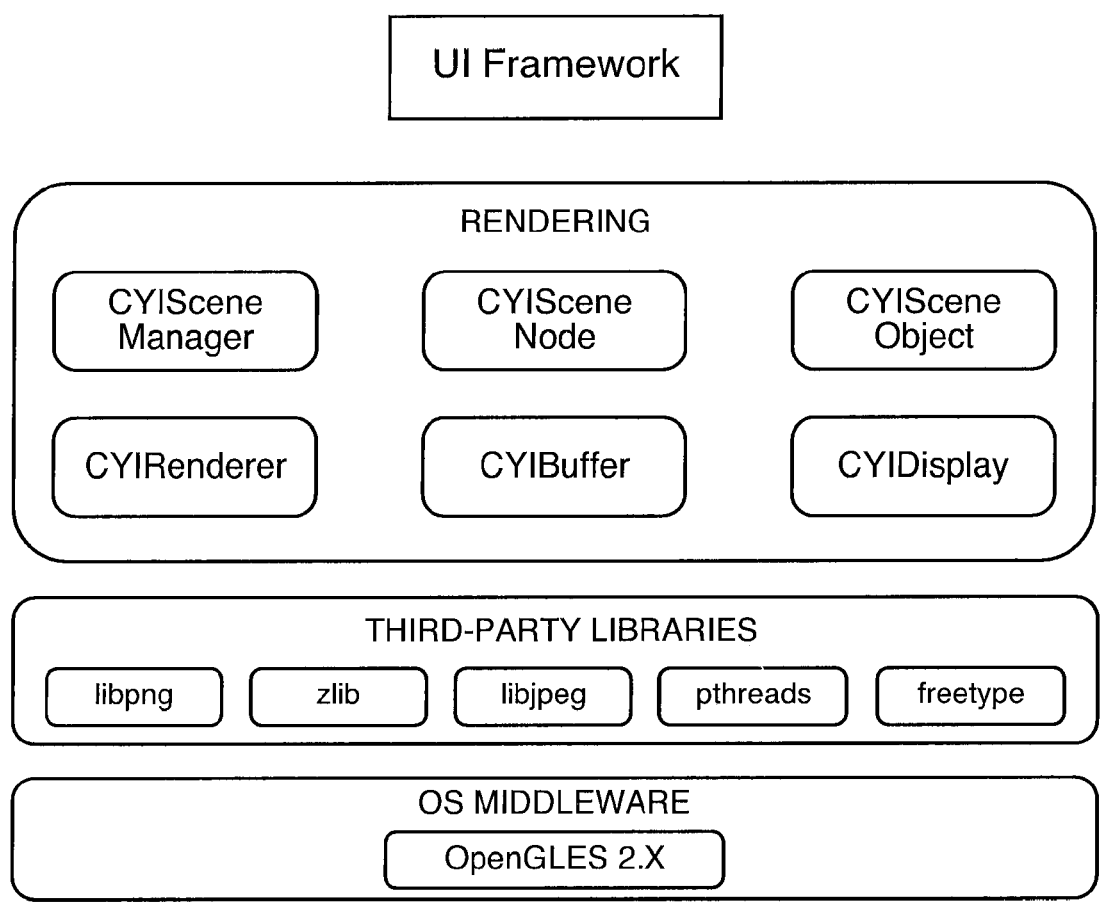
FIG. 4 is a more detail system resource diagram illustrating resources of the rendering system.
Figure 5:
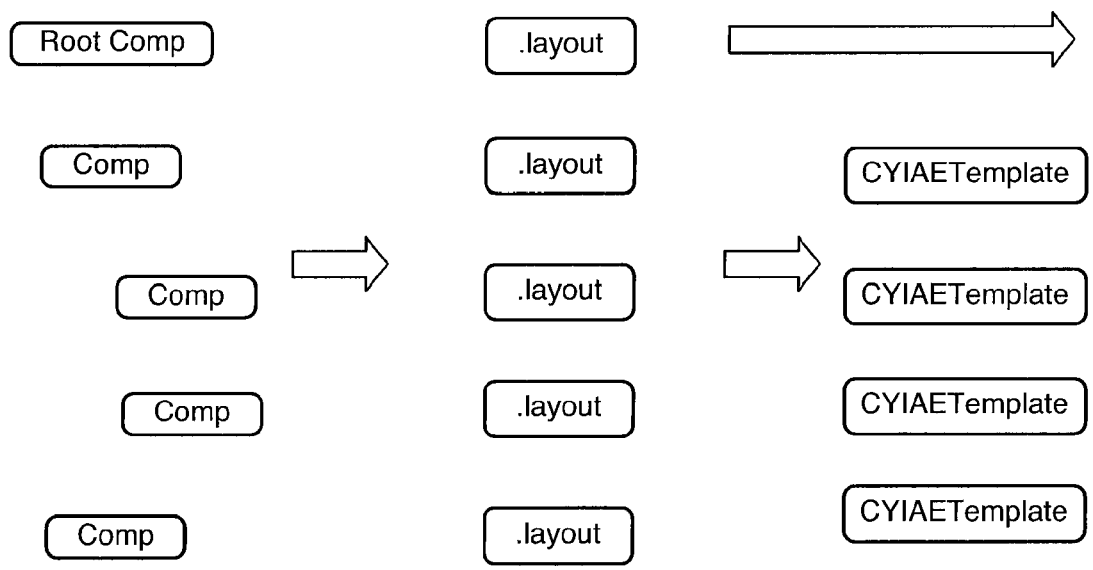
FIG. 5 illustrates the process of importation of files to the platform of the present invention.
Figure 8:
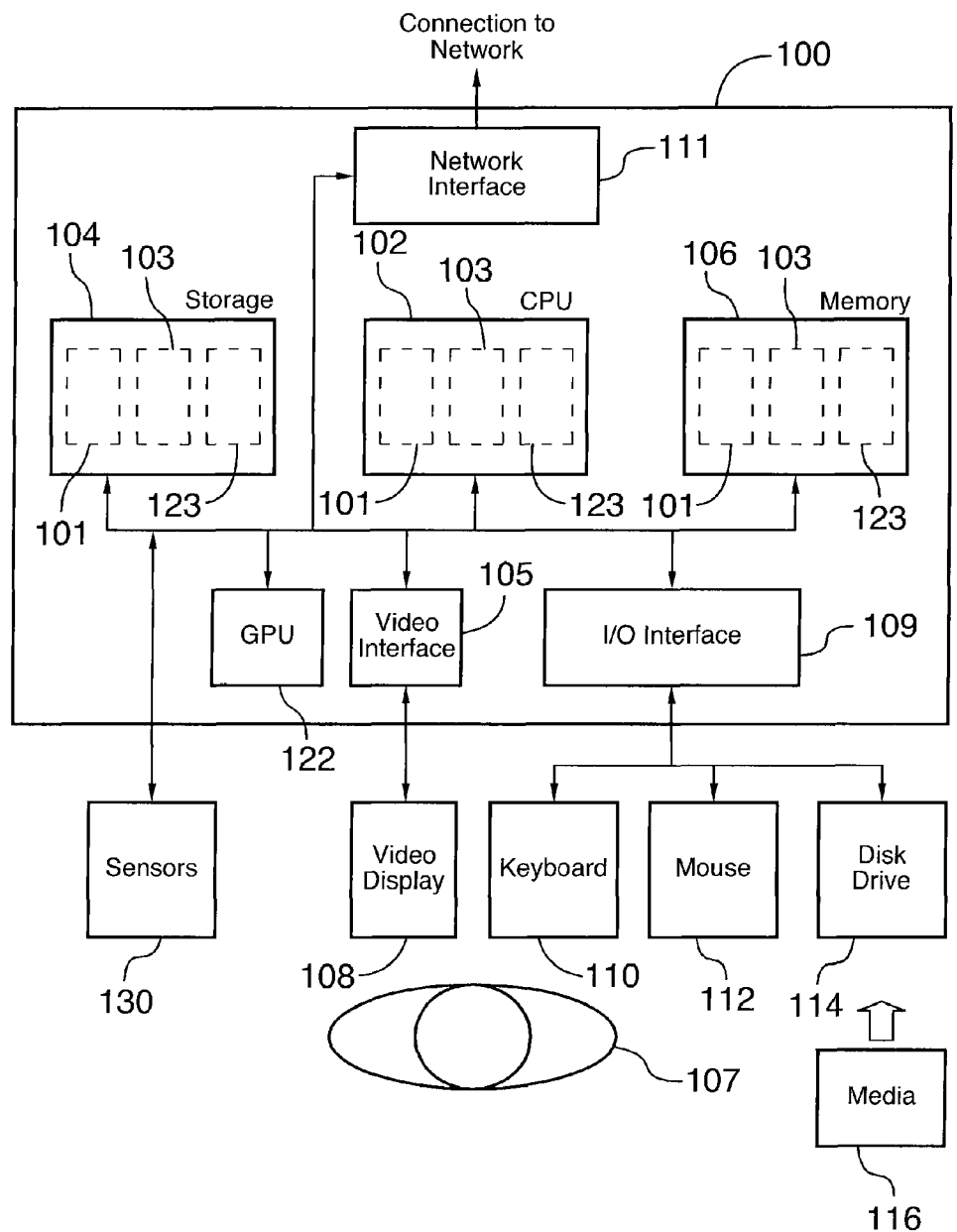
FIG. 8 illustrate a generic computer system which may provide a suitable operating environment for various embodiments.

Referring to FIG. 8, the present system and method may be practiced in various embodiments. A suitably configured generic computer device, and associated communications networks, devices, software and firmware may provide a platform for enabling one or more embodiments as described above. By way of example, FIG. 4 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate through wired or wireless communications with other suitably configured data processing systems (not shown). The generic computer device 100 may be embodied in various form factors including desktop and laptop computers, and wireless mobile computer devices such as tablets, smart phones and super phones operating on various operating systems. It will be appreciated that the present description does not limit the size or form factor of the computing device on which the present system and method may be embodied.

While illustrative embodiments of the invention have been described above, it will be appreciated that various changes and modifications may be made without departing from the scope of the present invention.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A computer-implemented method comprising:
   (a) presenting user interface features for receiving inputs representative of a composition of a plurality of user interface (UI) control elements that reflect a designer's intent, at least one of the UI control elements having a plurality of states and a class name;
   (b) presenting user interface features for receiving selections defining a timeline, of key times for state-to-state transitions of the UI control elements between the plurality of states; the timeline of key times defining an order and timing for the state-to-state transitions;
   (c) extracting a user interface asset file comprising the UI control elements, a layout the of presentation-related UI controls and a timeline file of behavior-related UI controls, the layout the comprises data encoding attributes of a scene graph, the scene graph comprising a tree structure of scene nodes, each scene node corresponding to a respective UI control element of the UI control elements to define a position of the respective UI control element in the user interface space, the timeline the comprises the timeline for the state-to-state transitions of the UI control elements of the scene graph in the layout the, the UI control elements of the layout the linked to corresponding UI control elements of the timeline the by the class name; and
   (d) compiling the user interface asset file to render an executable user interface operable to display said state-to-state transitions.

2. The method of claim 1, comprising encoding the plurality of UI control elements with one or more data components indicative of the designer's intent, such that the plurality of UI control elements are manipUI atable by a user in connection with a user interface design workflow.

3. The method of claim 1, wherein the timeline defining the key times for state-to-state transitions comprises one or more markers, each marker corresponding to a respective state of the state-to-state transitions.

4. The method of claim 3, wherein each marker comprises data representing a start time and a duration period of a corresponding state.

5. The method of claim 1, wherein the UI control elements comprise a plurality of UI components, including one or more presentation components and one or more behaviour components, and further comprising:
   (a) generating one or more UI controls, including one or more behavior controls; and
   (b) adding behavior class names for at least one of the behaviour controls.

6. The method of claim 5, comprising:
   (a) exporting the user interface controls to asset files; and
   (b) importing the user interface controls into source code.

7. The method of claim 6, further comprising accessing or generating specific code elements for handling one or more user interface related business logic rules.

8. The method of claim 1, wherein the timeline the comprises information required to animate attributes of scenes in the layout file.

9. The method of claim 1, wherein the timeline includes a first key time for a first state-to-state transition of a first UI control element and a second key time for a second state-to-state transition of a second UI control element, the first key time being the same as the second key time to coordinate the timing for the first state-to-state transition of the first UI control element and the second state-to-state transition of the second UI control element.

10. The method of claim 1, wherein the display of said state-to-state transitions provides animation of the at least one UI control element, wherein the timeline comprises a list of tracks, each track corresponding to an attribute for animation of the at least one UI control element, each track containing at least one of the key times to identify at least one point in time a value for the attribute for animation changes to a new value for the attribute for animation.

11. A computer system for streamlined user interface (UI) development, the system comprising:
   (a) one or more processors, executing one or more computer programs, configured to:
   (i) present user interface features for receiving, inputs representative of a plurality of user interface (UI) control elements that reflect a designer's intent, at least one of the UI control elements having a plurality of states and a class name:
   (ii) present user interface features for receiving selections defining a timeline of key times for state-to-state transitions of the at least one of the plurality of UI control elements between the plurality of states, the timeline of key times defining an order and timing for the state-to-state transitions;
   (iii) extracting a user interface asset the comprising the UI control elements, a layout file of presentation-related UI controls and a timeline the of behavior related UI controls, the layout file comprises data encoding attributes of a scene graph, the scene graph comprising a tree structure of scene nodes, each scene node corresponding to a respective UI control element of the UI control elements to define a position of the respective UI control element in the user interface space, the timeline file comprises the timeline for the state-to-state transitions of the UI control elements of the scene graph in the layout file. the UI control elements of the layout the linked to corresponding UI control elements of the timeline file by the class name; and (iv) compile the user interface asset file to render an executable user interface operable to display said state-to-state transitions.

12. The system of claim 11, wherein the environment includes an import utility for importing video content related to a user interface design from a motion graphics platform or a visual graphics platform.

13. The system of claim 12, further comprising an extractor utility that decomposes a user interface design into a series of user interface components, and wherein the composition utility is configured to (A) generate one or more user interface controls for a user interface design of the video content, and (B) add behavior class names for a behavior-related control of the behavior-related controls.

14. The system of claim 13 wherein the extractor utility analyzes the user interface components and determines which user interface components are related to UI controls, and categorizes the UI controls so as to identify the presentation-related UI controls, and the behavior-related UI controls.

15. The system of claim 11, wherein the environment is configured to generate user interface assets by (A) exporting each UI control to a UI asset the, and (B) importing each UI control into source code, and accessing or generating one or more code components to execute business logic related to user interface functions.

16. The system of daim 11, wherein the timeline defining the state-to-state transitions comprises one or more markers, each marker corresponding to a respective state in the state-to-state transitions.

17. The system of claim 11, wherein the system includes or links to a computer system executing a motion graphics platform or a visual graphics platform, and also a plug-in for incorporating the rendered executable user interface into the motion graphics platform or visual graphic platform.

18. The system of claim 11, wherein the system comprises a display, and the composition utility presents on the display (A) a composition panel and (B) a timeline panel, wherein the timeline panel is confiaured to appy effects to the UI control elements based on user input from the composition panel or the timeline panel.

19. The system of claim 11, wherein the environment includes an import utility for importing video content related to a user interface design from a motion graphics platform or a visual graphics platform.

20. A non-transitory computer-readable storage medium storing computer executable instructions, that when executed, causes the processor to:

(a) present user interface features for receiving inputs representative of a composition of a plurality of user interface (UI) control elements that reflect a designer's intent at least one of the UI control elements having a plurality of states and a class name;

(b) present user interface features for receiving selections defining the electronic signals encoding data for a timeline of key times for state-to-state transitions of the at least one of the UI control elements between the plurality of states, the timeline of key times defining an order and timing for the state-to-state transitions; and (c) extract a user interface asset file comprising the UI control elements, a layout the of presentation-related UI controls and a timeline file of behavior-related UI controls, the layout the comprises data encoding attributes of a scene graph, the scene graph comprising a tree structure of scene nodes, each scene node corresponding to a respective UI control element of the UI control elements to define a position of the respective UI control element in the user interface space, the timeline the comprises the timeline for the state-to-state transitions of the UI control elements of the scene graph in the layout the, the UI control elements of the layout the linked to corresponding UI control elements of the timeline the by the class name;

(d) compile the user interface asset file to render an executable user interface to display said state-to-state transitions.

* * * * *

UNITED STATES PATENT AND TRADEMARK OFFICE
CERTIFICATE OF CORRECTION

PATENT NO. : 9,858,050 B2  
APPLICATION NO. : 13/933351  
DATED : January 2, 2018  
INVENTOR(S) : Andrew T. Emmons Page 1 of 1

It is certified that error appears in the above-identified patent and that said Letters Patent is hereby corrected as shown below:

In the Claims

Column 12, Line 7, replace "manipUI atable" with -- manipulatable --.

Signed and Sealed this  
Eleventh Day of December, 2018

Andrei Iancu  
*Director of the United States Patent and Trademark Office*

UNITED STATES PATENT AND TRADEMARK OFFICE
CERTIFICATE OF CORRECTION

PATENT NO.         : 9,858,050 B2
APPLICATION NO.    : 13/933351
DATED              : January 2, 2018
INVENTOR(S)        : Andrew T. Emmons It is certified that error appears in the above-identified patent and that said Letters Patent is hereby corrected as shown below:

In the Claims

Column 11, Claim 1, Line 55: re place "the" with --file--.
Column 11, Claim 1, Line 57: replace "the comprises" with --file comprising--.
Column 11, Claim 1, Line 63: replace "the comprises" with --file comprising--.
Column 11, Claim 1, Line 65: replace "layout the" with --layout file--.
Column 11, Claim 1, Line 66: replace "layout the" with --layout file--.
Column 11, Claim 1, Line 67: replace "timeline the" with --timeline file--.

Column 12, Claim 8, Line 30: replace "timeline the" with --timeline file--.

Column 12, Claim 11, Line 57: replace ":" with --;--.
Column 12, Claim 11, Line 64: replace "extracting" with --extract--.
Column 12, Claim 11, Line 64: replace "asset the" with --asset file--.
Column 12, Claim 11, Line 66: replace "timeline the" with --timeline file--.
Column 12, Claim 11, Line 67: replace "comprises" with --comprising--.
Column 13, Claim 11, Line 6: replace "comprises" with --comprising--.
Column 13, Claim 11, Line 8: replace "." with --,--.
Column 13, Claim 11, Line 9: replace "layout the" with --layout file--.

Column 13, Claim 12, Line 14: replace "environment" with --system--.
Column 13, Claim 12, Line 15: replace "includes" with --further comprises--.

Column 13, Claim 13, Line 20: replace "wherein the" with --a--.

Column 13, Claim 14, Line 27: replace "related to UI" with --related to the UI--.

Column 13, Claim 15, Line 31: replace "environment" with --system--.
Column 13, Claim 15, Line 32: replace "configured" with --further configured--.
Column 13, Claim 15, Line 33: replace "asset the" with --asset file--.

Signed and Sealed this
Seventeenth Day of November, 2020

Andrei Iancu
*Director of the United States Patent and Trademark Office*

CERTIFICATE OF CORRECTION (continued)
U.S. Pat. No. 9,858,050 B2

Column 13, Claim 16, Line 37: replace "daim" with --claim--.

Column 14, Claim 18, Line 3: replace "system comprises" with --system further comprises--.
Column 14, Claim 18, Line 4: replace "a display, and the composition utility presents on the display" with --a composition utility and a display, the composition utility configured to present on the display:--.
Column 14, Claim 18, Line 6: replace "confiaured to appy" with --configured to apply--.

Column 14, Claim 19, Line 9: replace "environment" with --system--.
Column 14, Claim 19, Line 12: delete "or".

Column 14, Claim 20, Line 22: delete "the electronic signals encoding data for".
Column 14, Claim 20, Line 28: replace "layout the" with --layout file--.
Column 14, Claim 20, Line 30: replace "layout the comprises" with --layout file comprising--.
Column 14, Claim 20, Line 36: replace "timeline the comprises" with --timeline file comprising--.
Column 14, Claim 20, Line 38: replace "layout the" with --layout file--.
Column 14, Claim 20, Line 39: replace "layout the" with --layout file--.
Column 14, Claim 20, Line 40: replace "timeline the" with --timeline file--.
Column 14, Claim 20, Line 40: replace "name;" with --name; and--.